(No Model.)
G. W. STRICKLAND.
ORNAMENTAL BORDER FOR FLOWER BEDS, &c.
No. 348,598. Patented Sept. 7, 1886.
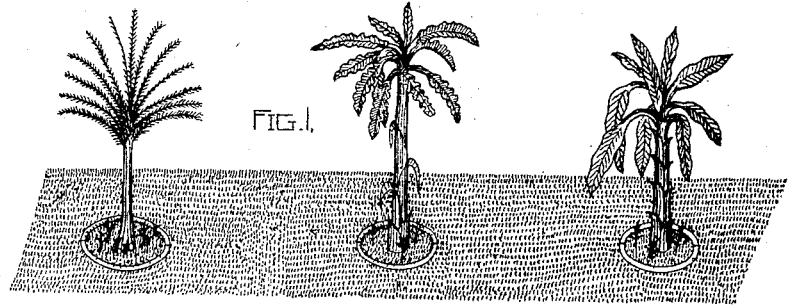
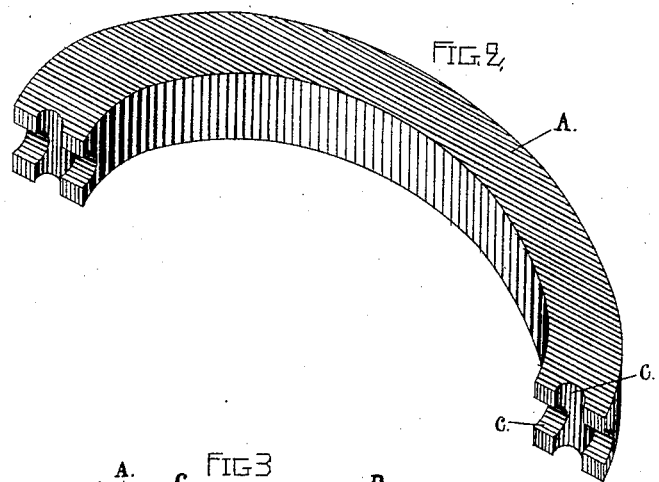
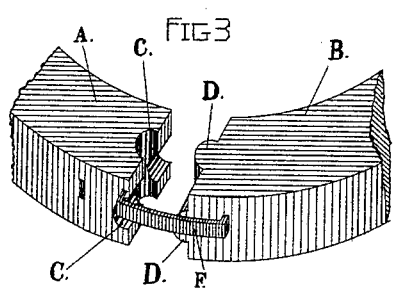
ATTEST.
L E Redstone
John H. Redstone
INVENTOR.
George W. Strickland

UNITED STATES PATENT OFFICE.

GEORGE W. STRICKLAND, OF SAN FRANCISCO, CALIFORNIA.

ORNAMENTAL BORDER FOR FLOWER-BEDS, &c.

SPECIFICATION forming part of Letters Patent No. 348,598, dated September 7, 1886.

Application filed October 16, 1885. Serial No. 180,047. (No model.)

*To all whom it may concern:*

Be it known that I, GEORGE W. STRICKLAND, a citizen of the United States, residing in the city and county of San Francisco, and State of California, have invented a new and useful Border for Circular or other Ornamental Figures for Lawns and Gardens, of which the following is a specification.

My invention relates to improvements in ornamental borders for flower-beds or for tree and shrub guards for gardens and lawns.

Figure 1 is a perspective view showing the same as applied in a grass-plat or lawn. Fig. 2 is a section or division of the same in perspective. Fig. 3 is a view showing the opposite half or segment of the same.

The object of my invention is to provide a ready, neat, and ornamental border to place around trees and shrubs in lawns or grass-plats. To effect this object, I form suitable molds of metal or other suitable material for forming the casting, which I generally form of Portland cement, sand, "plaster-of-paris," white lime, or other suitable material to form an artificial stone with a smooth white surface.

I do not confine myself to any particular kind of material, so that I secure neatness, strength, and durability.

I form the sections in half-circles, so that two of them form a full circle, or they may be six or eight sided, or of other angular or ornamental form calculated to form a neat inclosure for plants, trees, or flowers in grass-plats or lawns.

By means of the portable sections A and B, of artificial stone or other durable material, I form a solid durable border for surrounding trees or small beds of flowers in grass-plats or lawns.

I employ the horizontal and vertical grooves C in the end of the section A, and the cross-tenons D upon the end of the section B, and the clamp F to make a secure connection or joint.

The following is the mode of employing my improved ornamental border or tree-guard. I cut the grass or sod away from around the tree for the diameter of the circle of the border. I then cut the ground away to exactly fit the border and place the section A or B. Then place the other section, fitting the obverse grooves C and tenons D, and inserting the locking-clamp F, thus forming a compact solid joint. The border, when set, extends just above the surface of the ground, and the inner part, between the border and the tree or other plant, is neatly filled with suitable firm earth-mold, rendering a very neat appearance.

It will be understood that any required artistic design may be molded upon the border described.

Having thus described my invention, what I claim, and desire to secure by Letters Patent, is—

The ornamental border described, comprising two semicircular sections of artificial stone having in their ends the vertical and horizontal grooves C and tenons D, in combination with the metallic clamps having inturned ends, which are embedded in the sections, as set forth.

GEORGE W. STRICKLAND.

Witnesses:
L. E. REDSTONE,
JOHN H. REDSTONE.